United States Patent [19]
Hasegawa et al.

[11] 4,055,490
[45] Oct. 25, 1977

[54] ACTIVATED SLUDGE PROCESS

[75] Inventors: Tsuneo Hasegawa; Seitaro Hasegawa, both of Kyoto, Japan

[73] Assignee: Seisuikogyo Co., Ltd., Osaka, Japan

[21] Appl. No.: 697,209

[22] Filed: June 17, 1976

[30] Foreign Application Priority Data

June 24, 1976 Japan .................................. 51-76856
June 24, 1976 Japan .................................. 51-76857

[51] Int. Cl.² .............................................. C02C 5/10
[52] U.S. Cl. ..................................... 210/17; 210/151
[58] Field of Search ..................... 210/24, 17, 15, 150, 210/151, 30 R, 30 A, 3, 13, 44

[56] References Cited

U.S. PATENT DOCUMENTS 3,617,551  11/1971  Johnston ............................. 210/30 A
3,779,906  12/1973  Levin ..................................... 210/17

FOREIGN PATENT DOCUMENTS 1,353,211  1/1964  France ................................. 210/17
2,306,178  8/1974  Germany ............................. 210/44

Primary Examiner—Thomas G. Wyse
Assistant Examiner—Benoit Castel
Attorney, Agent, or Firm—Blanchard, Flynn, Thiel, Boutell & Tanis

[57] ABSTRACT

In the activated sludge process for treating waste water containing a spongy substance in a flowing state by subjecting it to aeration in an aeration tank, an improved process comprising taking out a portion of said spongy substance from the aeration tank continuously in order to remove a part of the sludge adhering to the spongy substance and then returning the thus reclaimed spongy substance into the aeration tank for reuse.

7 Claims, 1 Drawing Figure

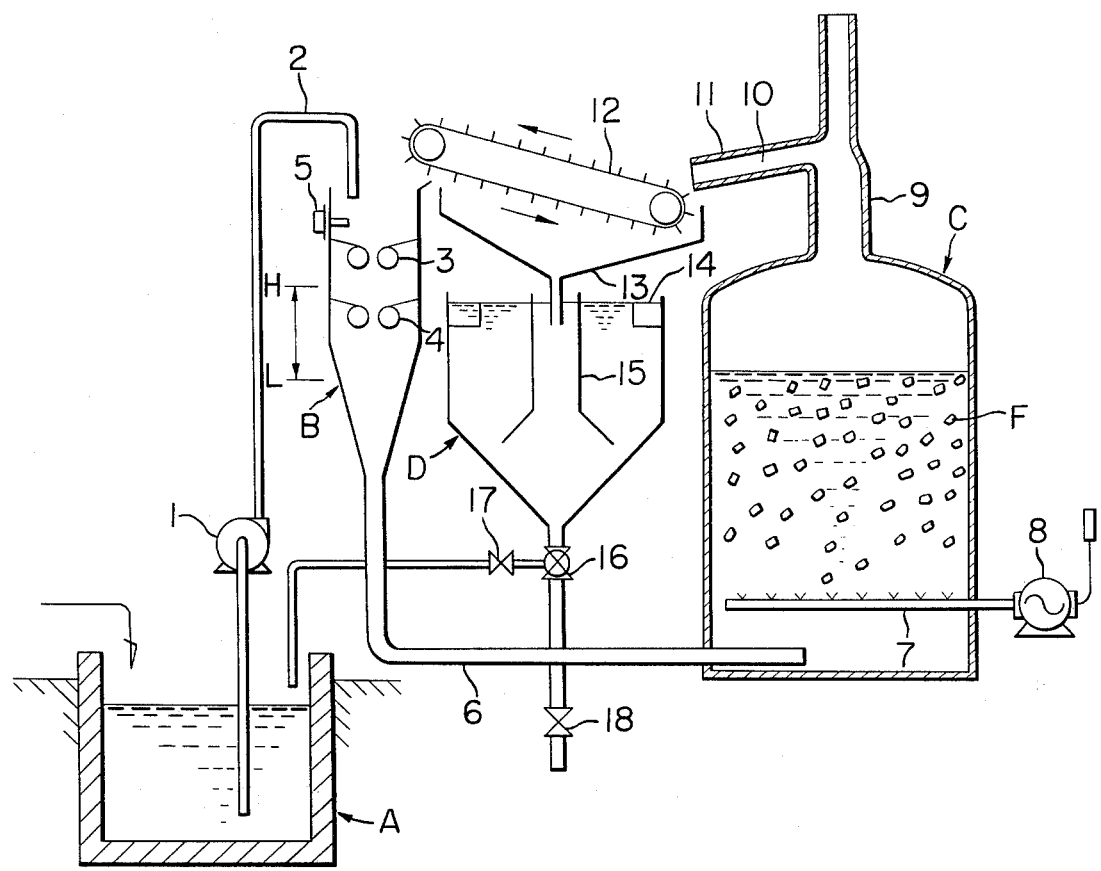

ACTIVATED SLUDGE PROCESS

BACKGROUND OF THE INVENTION a. Field of the Invention

The present invention relates to an improvement of the activated sludge process for treating waste water containing a spongy substance by aeration in an aeration tank.

b. Description of the Prior Art

The activated sludge process for treating waste water by employing a spongy substance such as foamed polyurethane, foamed polyethylene, etc. has recently been developed. Inasmuch as the activated sludge for use therein is in the form of bulky grains convenient for handling, this waste water treating process promises various advantages which cannot be expected from other conventional activated sludge processes. Nevertheless, when it comes to the question of putting it to practical use, it still involves various problems that need be solved.

SUMMARY OF THE INVENTION

The present inventors have found that, in the case of the activated sludge in the form of bulky spongy grains consisting of a spongy substance as a nucleus and a layer of sludge covering the surface of said nucleus, which is generated by the activated sludge processes in the prior art, the passing of waste liquid through the central part of the spongy grains is hampered, resulting in a decrease of the concentration of oxygen supplied to the inner part thereof and gradual proliferation of anaerobic bacteria accordingly, whereby the waste water treating efficiency of the activated sludge lowers gradually.

The present invention has been accomplished on the basis of this finding, and it relates to an improved process for treating waste water by employing a spongy substance, which renders it possible to prevent proliferation of anaerobic bacteria and perform the activated sludge process at a high efficiency for a long period of time.

A principal object of the present invention is to provide an activated sludge process comprising taking out a portion of the spongy substance charged in an aeration tank continuously or intermittently from said tank, reclaiming the spongy substance taken out of the aeration tank by removing a part of the sludge adhering thereto, and then returning the thus reclaimed spongy substance into the aeration tank for reuse.

Another object of the present invention is to provide an activated sludge process which renders it possible to perform the taking-out of the spongy substance used in the active sludge process automatically and simply.

A further object of the present invention is to provide an activated sludge process which renders it possible to perform the reclamation of the spongy substance taken out of the aeration tank automatically and simply.

A still further object of the present invention is to provide an activated sludge process which renders it possible to return the reclaimed spongy substance to the aeration tank automatically and simply.

According to the present invention, inasmuch as the spongy substance taken out of the aeration tank is reclaimed by removing the sludge adhering thereto and is returned to the aeration tank thereafter, tha passing of the waste liquid through the inner part of activated sludge in the form of a bulky sponge is facilitated, proliferation of anaerobic bacteria in the course of the activated sludge process can be effectively prevented, realization of the functions of the activated sludge process can be always ensured, and lowering of the waste water treating efficiency can be avoided. In order to reclaim the spongy substance by removing a part of the activated sludge, various methods can be employed. For instance, there is a method wherein the spongy substance covered with activated sludge as taken out of the aeration tank is pressed in the water, in the air, or in the air while pouring water thereon. Further, it is possible to perform the reclamation by intensively stirring the spongy substance in the water after taking it out of the aeration tank. A method of pressing the spongy substance in the presence of air and a method of pressing it in water containing a large quantity of air dissolved therein are especially preferable because both methods render it possible to supply fresh air, or oxygen, sufficiently to the inner part of the spongy substance at the time of reclamation.

BRIEF DESCRIPTION OF THE DRAWING

The appended drawing is a schematic representation of the front view of a longitudinal section of an embodiment of the apparatus for use in the activated sludge process according to the present invention.

DETAILED DESCRIPTION OF THE INVENTION

In the appended drawing, A denotes a storing tank for the waste-water-to-be-treated or the raw waste water, B denotes a head-tank, C denotes a closed-type aeration tank, and D denotes a settling tank. The reference numeral 1 denotes a lift pump, 2 denotes a raw feed supply pipe for the head-tank B, and 3 and 4 denote a roll-type press respectively. 5 denotes an electrode interlocking with the pump 1 for the purpose of maintaining the water level within the head-tank B in the range of H $\sim$ L. 6 denotes a pipe for connecting the head-tank B with the aeration tank C, 7 denotes an air-distributing pipe, 8 denotes a blower, 9 denotes an upper narrowed portion, 10 denotes an outlet, and 11 denotes a by-path. 12 denotes a conveyor, 13 denotes a receiving tank, 14 denotes a water-catching groove, 15 denotes an inner cylinder, and 16, 17 and 18 denote values, respectively. F denotes a spongy substance accommodated in the aeration tank in flowing state.

In the head-tank B are installed two sets of twin press rolls 3, 4. The head-tank B is connected with the aeration tank C through the interconnecting pipe 6. Also, the head-tank B is provided with the electrode 5 which is so constructed as to interlock with the lift pump 1, whereby when the water level within the head-tank B falls to the level L the pump works automatically, while when the water level rises to the level H the pump stops working automatically. In this way, the working and the suspension of working of the pump 1 are repeated alternately.

The aeration tank C illustrated herein is of the closed type, but is also will do to utilize an open-type aeration tank. The top portion of the aeration tank C is provided with an upright portion 9 whose transverse cross-section is smaller than the transverse cross-section of the aeration tank proper, and the outlet 10 is provided in the middle of said upper narrowed portion 9. In the lower part of the aeration tank C is disposed the air-distributing pipe 7 connected with the blower 8.

The conveyor 12 is so disposed as to extend from beneath the outlet of the by-path 11 to above the head-tank B, and beneath the conveyor 12 there is provided the receiving tank 13 whose lower part opens into the inner cylinder 15 within the precipitation tank D.

The waste water treating apparatus of the present invention illustrated in the drawing is of the above construction, so that the waste water introduced into the aeration tank C is supposed to be stirred and aerated with air blown into said tank by way of the blower 8 and the air-distributing pipe 7 in the presence of a spongy substance (in the form of small pieces) with activated sludge adhering thereto, which is flowing in the tank freely, thereby undergoing the so-called activated sludge process.

When the water level in the aeration tank C rises to reach to the vicinity of the lower end of the upper narrowed portion 9, there is brought about the so-called air-lift effect by virtue of an ascending current due to air blown in through the air-distributing pipe 7, and a portion of the mixture of water and spongy substance within the tank ascends along the upper narrowed portion 9, flows over the brim of outlet 10, and is discharged onto the conveyor 12 by way of the by-path 11. When the water level in the tank falls as a result of this discharge, the air-lift effect is discontinued temporarily pending the restoration of the water level to a specified level, and consequently, the discharge of the mixture of water and spongy substance accommodated in the aeration tank is repeated intermittently.

The water in the mixture discharged onto the conveyor 12 is separated from the spongy substance by means of the conveyor and is gathered in the receiving tank 13 to flow into the inner cylinder 15 of the settling tank D through a pipe provided for the lower end of said receiving tank 13. Then, after separating the accompanying solid matters within the precipitation tank D, the water is taken out as the treated waste water by way of the water-catchment groove 14. The sludge deposited in the lower part of the precipitation tank D is drawn out of the tank through the valve 16 and is returned to the raw waste-water storing tank through the valve 17 or introduced into a hydroextractor for sludge through the valve 18.

The spongy substance separated from excess water on the conveyor 12 travels with the movement of the conveyor 12 and is thrown in the head-tank B from the upper extremity of the conveyor 12. The spongy substance thus thrown in the head-tank B is first pressed by a pair of press rolls 3 in the air, whereby excess activated sludge (including the activated sludge adhering to the surface and the dense activated sludge impregnated in the inner part of the spongy substance) is squeezed and removed and, at the same time, fresh air is supplied to the inner part of the spongy substance. The spongy substance thus deprived of excess activated sludge is subsequently pressed again by the other pair of press rolls 4 within the raw waste water supplied from the raw feed supply pipe 2, whereby the spongy substance releases excess air, becomes capable of flowing freely in the water and is returned to the aeration tank by way of the pipe 6 together with the water supplied.

The head-tank B is equipped the electrode 5 which is so constructed as to interlock with the lift pump 1, whereby when the water level in the head-tank falls to the level L the pump works automatically, while when said water level rises to the level H the pump stops working automatically, and by virtue of the repetition of the automatic operation as above, the water level within the head-tank B is always maintained in a specified range. Hence it follows that at least the first pair of the two pairs of presses 3 and 4 press the spongy substance in air, or in air in the presence of water being poured thereon, and the remaining pair of presses press the spongy substance in water. Accordingly, the spongy substance taken out of the aeration tank C is pressed either in air or in air in the presence of water being poured thereon once at least thereby to be deprived of excess sludge and concurrently supplied with fresh air (or oxygen). The inner part of the spongy substance pressed in air contains plenty of air, and the spongy substance in this condition is apt to float on the surface of the water and cannot flow freely under water. Howver, when it is pressed again in water, it releases excess air and becomes capable of freely flowing under water. In this connection, the pumping-up capacity of the lift pump 1 is larger than the amount of water to be discharged from the water-catching groove 14.

The above described apparatus and the waste-water treating process utilizing it represent one mode of practicing the present invention, and various alterations and modification thereof are of course conceivable. For instance, it will do to perform the waste water treatment by using a closed type or an open type aeration tank not provided with the rising member, carrying out the work of taking out the treated waste water containing the spongy substance from the aeration tank by means of a separate waste liquid pump and aerating the waste water while maintaining the water level in the aeration tank at a practically fixed level. It also will do to take out only a portion of the treated waste water by way of the upper narrowed portion 9 and the outlet 11 instead of taking out the whole waste water treated in the aeration tank C by way of the upper narrowed portion 9 and the outlet 11, and take out the remainder by other appropriate means without passing through the upper narrowed portion 9. As to the press for the purpose of pressing the spongy substance taken out, one pair of presses may suffice; in this case, however, it is desirable to dispose them to be capable of pressing the spongy substance in air or in air in the presence of water being poured thereon. It also will do to dispose the presses between the conveyor 12 and the head-tank B. The means for reclamation of the spongy substance is not limited to the herein illustrated roll-type press. That is, presses of other types as well as any other optional reclamation means can be employed as long as they are capable of removing a part of the adhering or impregnated sludge from the spongy substance. As the water to be supplied to the head-tank B, water from other optional supply sources can be used. Instead of providing the electrode 5 for the head-tank B, it will do to operate the pump 1 intermittently by the use of a timer. Further, as an alternate for the provision of the head-tank B, a small tank-shaped member provided with an appropriate opening formed in the lower part thereof and accommodating press rolls can be installed on the upper part of an open- or a closed-type aeration tank thereby to introduce the spongy substance taken out of the aeration tank by an appropriate means into said tank-shaped member to subject it to pressing therein and then return the thus reclaimed spongy substance to the aeration tank by way of said opening. In this case, the opening formed in the lower part of said tank-shaped member can be disposed either below the surface of the waste water in the course of treatment within the aeration tank or at an appropriate distance above the same surface.

Application of the process and the apparatus of the present invention to the activated sludge process can prevent adhesion and accumulation of excess sludge onto the surface and the inner part of the spongy substance within the aeration tank. And, as a result, infiltration of the liquid into the inner part of the spongy substance is improved, and lack of oxygen in the inner part of the spongy substance can be effectively alleviated. Besides, it is rendered possible to supply oxygen positively to the inner part of the spongy substance at the time of reclamation thereof. Accordingly, proliferation of anaerobic bacteria in the inner part of the spongy substance in the course of the activated sludge process can be effectively prevented, and the activated sludge within the aeration tank can be always held in a satisfactory condition, so that the treatment of waste water can be performed intermittently and at a high efficiency over a long period of time. Moreover, it is rendered possible to take out the spongy substance from the aeration tank, reclaim the spongy substance thus taken out and send back the reclaimed spongy substance to the aeration tank with ease and automatically.

What is claimed is:

1. An activated sludge process for treating waste water, said process employing an aeration tank having at its upper end a narrowed discharge conduit of smaller transverse cross-sectional area than the transverse cross-sectional area of the main body of said aeration tank, which comprises the steps of: feeding waste water into said aeration tank and flowing an oxygen-containing gas upwardly through said waste water in said aeration tank and thence through said discharge conduit thereby aerating and agitating said waste water in the presence of a multitude of small spongy pieces, said spongy pieces being in a free flowing state suspended in the waste water in said aeration tank and having activated sludge adhering to the surfaces thereof, said spongy pieces retaining said activated sludge thereon in a condition effective to cause said waste water to be purified by said activated sludge under aerated conditions, the flow of said gas into said discharge conduit generating an air lift effect for moving waste water and spongy pieces from the top of said aeration tank upwardly into said discharge conduit;

intermittently or continuously discharging from said aeration tank a portion of the contents of said aeration tank comprising a mixture of said spongy pieces and treated waste water, said portion being discharged through said discharge conduit by the air lift effect;

feeding the spongy pieces discharged from said aeration tank into a head tank having pressing rolls located therein and containing the waste water that is to be fed into said aeration tank, and pressing the spngy pieces thereby removing a part of the sludge that is adhered thereto and is present in the interior thereof and then discontinuing the pressing whereby to restore the spongy pieces to a state in which they are capable of supporting treatment of waste water under aerated activated sludge conditions without proliferation of anaerobic bacteria in the interiors thereof;

and then returning the thus-treated spongy pieces into said aeration tank.

2. A process according to claim 1, wherein the pressing of the spongy pieces discharged from the aeration tank is performed by pressing said spongy pieces in air so as to permit said spongy pieces to absorb air.

3. A process according to claim 1, wherein the pressing of the spongy pieces discharged from the aeration tank is performed by pressing said spongy pieces in water so as to permit said spongy pieces to absorb water.

4. A process according to claim 1, wherein the pressing of the spongy pieces discharged from the aeration tank is performed by pressing said spongy pieces in air while pouring water thereon.

5. A process according to claim 1 in which the treated waste water and spongy pieces that have been discharged from said aeration tank are fed onto a conveyor and thereon separating the treated waste water from the spongy pieces; feeding the separated treated waste water into the lower end of a settling tank and removing treated waste water from the upper end of said settling tank and removing precipitated solids from the lower end of said settling tank; feeding the spongy pieces from said conveyor between a pair of pressing rolls in an ambient air atmosphere in said head tank whereby to squeeze and remove a part of the sludge therefrom and to permit fresh air to enter the interiors of the spongy pieces; and then returning the spongy pieces to said aeration tank.

6. A process as claimed in claim 5 in which said spongy pieces are fed from said conveyor into the upper end of said head tank having said pair of pressing rolls located in the upper end thereof, feeding fresh waste water to be treated into the upper end of said head tank and feeding said fresh waste water and spongy pieces from the lower end of said head tank into the lower end of said aeration tank.

7. A process as claimed in claim 6 in which said head tank has disposed therein a second pair of pressing rolls located below said first-mentioned pair of pressing rolls so that the spongy pieces pass between the rolls of the two pairs in series and including the step of maintaining the level of the fresh waste water in said head tank between a lower level below said second pair of pressing rolls and an upper level located between said first-mentioned pair and said second pair of pressing rolls.

* * * * *